Oct. 9, 1956 — J. P. J. VENTER — 2,765,744
AUTOMATIC CONTROL DEVICES FOR WINDMILL-DRIVEN PUMPS AND THE LIKE
Filed April 27, 1953 — 2 Sheets-Sheet 1

INVENTOR.
J. P. J. Venter
BY Wenderoth, Lind & Ponack
Attorneys

Oct. 9, 1956  J. P. J. VENTER  2,765,744
AUTOMATIC CONTROL DEVICES FOR WINDMILL-DRIVEN
PUMPS AND THE LIKE
Filed April 27, 1953  2 Sheets-Sheet 2
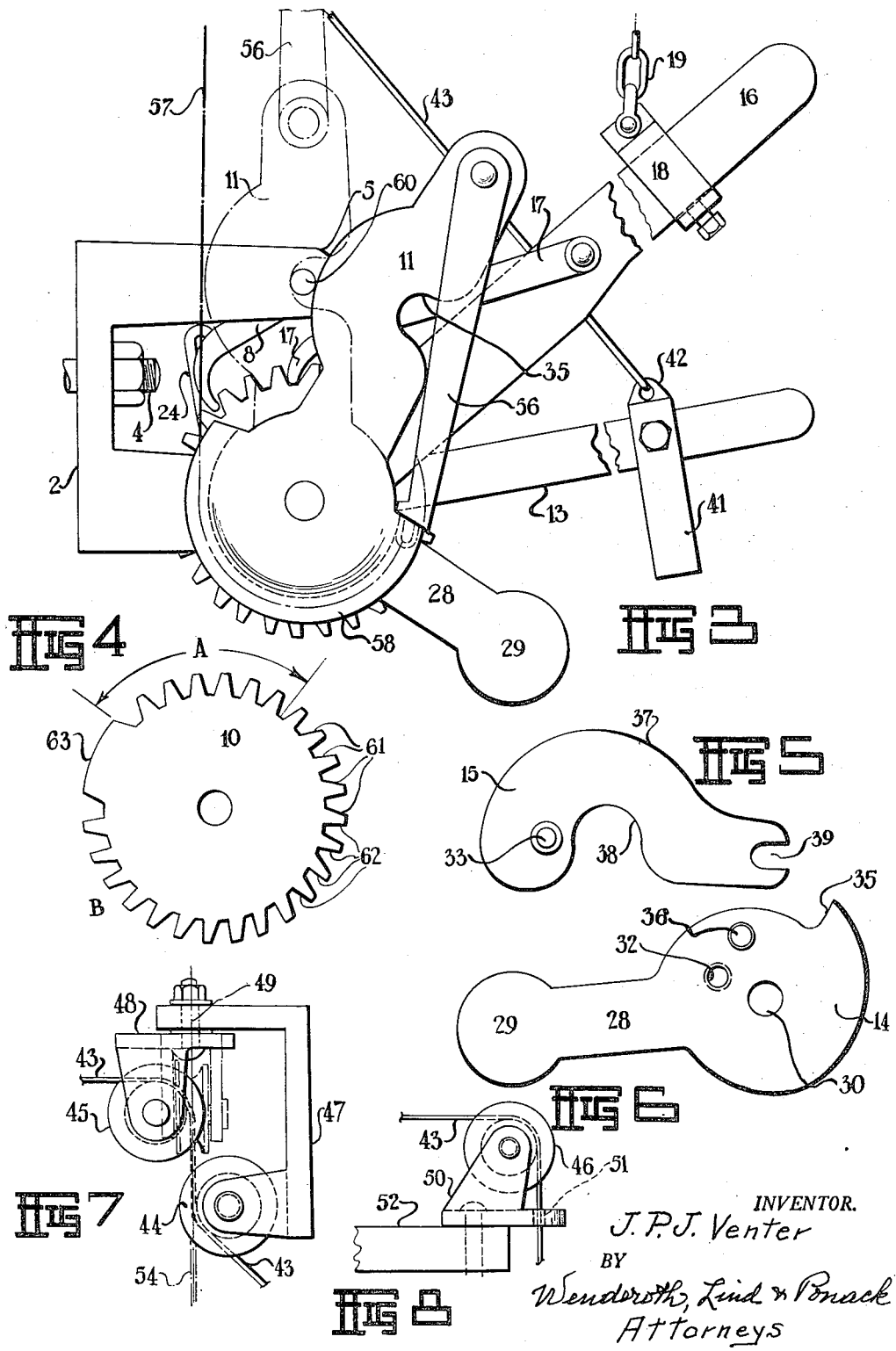
INVENTOR.
J. P. J. Venter
BY
Wenderoth, Lind & Ponack
Attorneys

United States Patent Office 2,765,744
Patented Oct. 9, 1956

2,765,744

AUTOMATIC CONTROL DEVICES FOR WIND-MILL-DRIVEN PUMPS AND THE LIKE

Johannes Petrus Jooste Venter, Petrusville, Cape of Good Hope, Union of South Africa Application April 27, 1953, Serial No. 351,254

Claims priority, application Union of South Africa May 1, 1952

8 Claims. (Cl. 103—28)

This invention relates to an improved float-actuated device for automatically controlling the operation of windmill pumps so that the pumping action is automatically stopped when the reservoir, tank or the like into which the water is pumped is full, while when the water level in the reservoir or the like reaches a predetermined low level, the pump means is automatically freed to permit further pumping of water.

An object of this invention is to provide an automatic windmill regulator of simple and inexpensive construction and which may be readily coupled and fitted to almost any kind of windmill in an unobstructive position.

A further object of this invention is to provide an automatic windmill regulator which derives its operating power from a reciprocating part of the windmill, preferably the reciprocating pump rod connecting beam.

A further object of this invention is to provide an automatic windmill regulator whereby the mechanical advantage for drawing the windmill brake cable is greatly increased during the final stages of drawing the windmill to the inoperative and/or braked position while during the easy primary stage a minimum mechanical advantage is effective.

Still another object of this invention is to provide an automatic windmill regulator which is incapable of further straining the brake cable, wire or the like after such regulator has been moved through its maximum extent.

A still further object of this invention is to provide an automatic windmill regulator whereby the release of the regulator, when the water level in the reservoir or the like has receded to a predetermined level, is momentary while the brake applying action or the like is gradual.

A still further object of this invention is to provide an automatic windmill regulator which is of compact construction and wherein no precision engineering is required while wear of the various parts will not materially affect the operation of the device.

A still further object of this invention is to provide an automatic windmill regulator which is readily mounted on any kind of windmill without subjecting the windmill to any modifications or alterations.

A still further object of this invention is to provide an automatic windmill regulator, controlled by float means operating in a reservoir, wherein such reservoir may be distantly disposed relative to the windmill while entanglement of the wire or like flexible means extending from the float to the regulator, as also the said means leaving guide pulleys, is eliminated while provision is made for continualy retaining long float-connecting cables or like flexibile elements taut.

In order to obtain a clear understanding of the present invention, reference will now be made to the accompanying sheets of drawings on which like reference numerals refer to like parts throughout the several views.

In the drawings:

Figure 3 is a view similar to Figure 1, showing the opposite side of the device;

Figure 4 is a side elevation of the toothed wheel;

Figure 5 is a side elevation of the pawl-control lever;

Figure 6 is a side elevation of the eccentrically loaded pawl-control operating means;

Figure 7 is a side view of the float cable-guide means; and

Figure 8 is a side view of the float cable-guide means at the float end of the cable.

Figure 1:
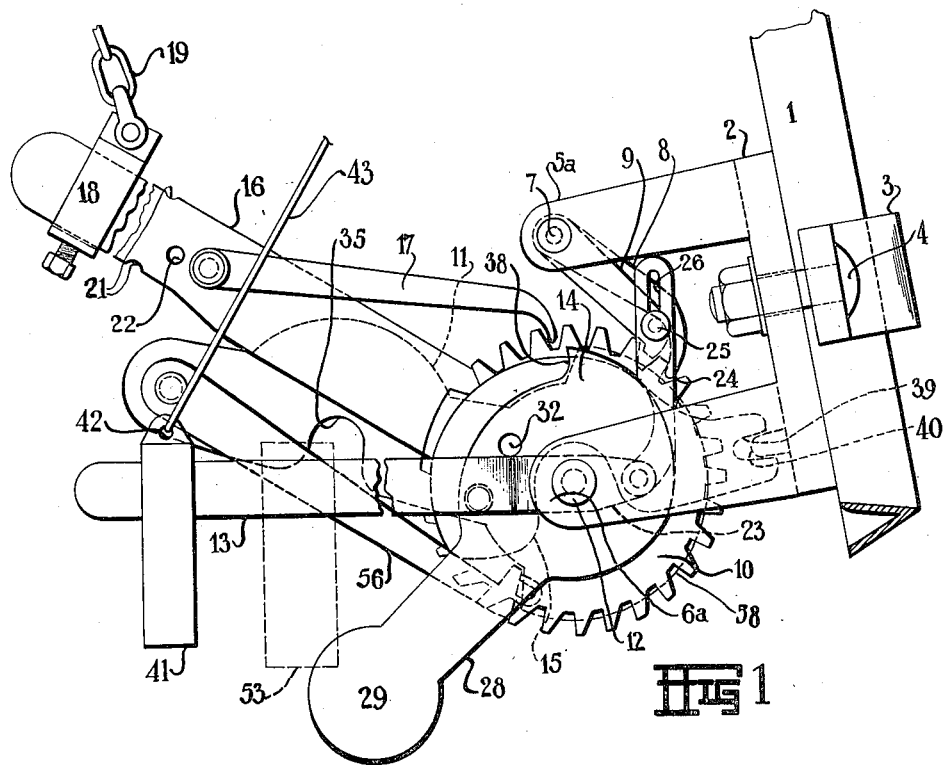
Figure 1 is a fragmentary side view of an automatic windmill brake-actuating device constructed according to the present invention.
Figure 2:
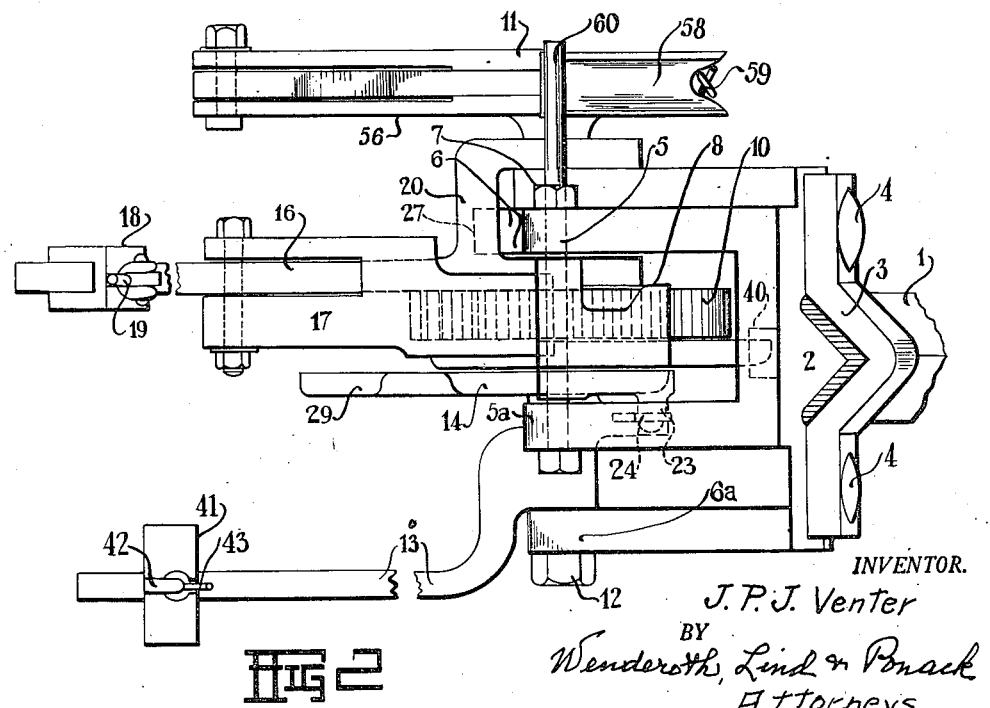
Figure 2 is a plan of Figure 1.

Referring to the drawings, reference numeral 1 denotes the corner member of a windmill tower to which the supporting structure or base 2 of the device according to this invention is clamped by means of clamp brackets 3 and bolts 4. The bolts 4 pass through oblong holes in the base 2 for lateral adjustment of the brake-actuating device. The base 2 is provided with two pairs of bearings or supports 5, 5a and 6, 6a of which the supports 5 and 5a locate a shaft 7 mounting the locking pawl 8 and the auxiliary element lock pawl 9 whereas the bearings 6 and 6a support the shaft means mounting the rotatable and oscillatable parts.

The shaft means in effect comprise two elements of which the one part is rotatable whereas the other is preferably fixed. Both parts may however, be rotatable. The movable part may be of tubular or part-tubular construction to which the toothed wheel 10 and the brake-actuating arm 11 are fixed adjacent its ends whereas the centre portion provides pivotal mounting for the actuating lever arm 16 and is also journalled in the bearing part 6. The second part 12 of the shaft extends into the hollow section of the first mentioned part and is also supported in the bearing or supporting member 6a. The float-actuated lever 13 and the auxiliary element 14 are mounted on the said shaft 12. The pivoted end of lever 16 is of bifurcated construction in order to embrace the bearing 6 of the base 1 in which the toothed wheel and brake-actuating arm shaft is journalled.

Adjacent the pivoted end of the actuating lever arm 16 the actuating pawl 17 is pivotally connected and arranged to engage by its free end the top section of the toothed wheel 10 while the locking pawl 8 also engages the said section of the toothed wheel but more towards the rear so that both pawls 17 and 8 are normally biased by gravity into their operative positions.

On the arm of the actuating lever 16 an adjustably fixable collar element 18 is provided which in turn provides means on its upper end for connection of a chain 19 for coupling of the lever 16 to the reciprocating bar or rod of the windmill. The downward stroke of the lever 16 is effected by gravity and limited by a projection 27 on bearing brackets 6 of the base 2 on which a transverse part 20 of the lever 16 may come to rest. By connecting the lever 16 to the pump rod or the like by means of a chain 19 exact or precise mounting of the device is not necessary while the extent of the operative stroke of the arm 16 may readily be varied. With this arrangement, only the last part of the upward stroke of the pump is employed for transmitting power for braking purposes. As the arm 16 is drawn upwardly, the pawl 17 engages the teeth of the toothed wheel 10 and rotates the latter rearwardly through a relatively small angle. The collar member 18 is readily fixable in any position along the lever 16 and to prevent movement, said lever may be provided with locking notches 21 on one or both edges for coacting engagement by the collar member 18 and/or its fixing screw. One or more holes 22 may be provided in the lever 16 for varying the coupling position of the pawl 17.

The float-actuated lever 13 is pivotally mounted about one end on the shaft 12 and provides a rearward extension 23 for pivotal mounting of the link 24 which in turn is connected by its upper end to pawl 9 by means of a pin or screw 25. In the top end of the link 24 a slot 26 is provided which is engaged by the pin 25 in order to provide for a degree of lost motion of the link 24 relative to the pin 25 and the pawl 9 so that the pawl 9 will only be retracted from the coacting part of the auxiliary element when the lever 13 approaches its maximum lowered position which is approximately horizontal as is shown in Figure 1.

Adjacent the lever 13 and rotatable about the shaft 12, the auxiliary element 14 is disposed. Said auxiliary element 14 is of a plate-like construction and provides a radial lever-like extension 28 of which the end is enlarged to form an eccentrically disposed weight 29. The said element 14 provides a central hole 30 whereby it is rotatably mounted on the shaft 12 and an eccentrically disposed hole 32 for engagement by a pin or transverse projection 33 provided on the outwardly directed face of the pawl-control device 15. In addition, a notch or catch 35 is provided in the upper region of the element 14 as also a transverse projection 36 on the outwardly directed face of the said element which projection 36 is adapted to rest on the upper face of the lever 13 adjacent the journal end of the latter but forwardly of the shaft 12.

The pawl-control lever 15 is of hook-like shape providing a cam-like upper surface 37 and a large notch 38 in its underface for clearing the shaft 12 while the extended rear end provides a notch 39 for engaging a tongue-like projection 40 provided on the base 2. The said tongue-like projection 40 forms a fulcrum about which the rear end of the device 15 may pivot and also slide to a limited extent.

The connection of the device 15 and the auxiliary element 14, by projection 33 and hole 32, is such that when the lever 13 is raised it rotates member 14 upwards and this motion is transferred to the device 15 by the aforesaid connection. The upper edge 37 of the device 15 firstly raises the pawl 17 out of engagement with the teeth of the wheel 10 and thereafter engages the pawl 8 for its disengagement with the teeth of the wheel 10.

On the arm 13 a weight 41 is disposed. The weight 41 is preferably adjustably fixed on the arm 13 and in addition provides an eye 42 to which the cable or wire 43 from the float is attached. The wire or cable 43 is passed over pulleys 44 and 45 and then across pulley 46 downwardly for connection on to the float floating in the reservoir, tank or the like. The pulley 44 is mounted for free rotation about a horizontal axis in a bracket 47 which is rigidly fixed in a suitable position on the windmill tower structure preferably at a spaced distance above the automatic braking device. Slotted holes in bracket 47 permit lateral adjustment when mounting the bracket by means of clamping bolts on to the windmill tower. The pulley 45 is mounted for rotation about a horizontal axis in a bracket 48 which in turn is pivotally secured to the bracket 47. The pulley 45 is mounted above the pulley 44 in vertical alignment in respect of opposite sides of such pulleys while the pivot axis of the pulley bracket 48 is arranged along a line 49 passing along the coacting faces of the said pulleys 44 and 45 so that when the bracket 48 is pivoted about its axis the desired alignment of the said two pulleys 44 and 45 is at all times maintained. By this arrangement the lower pulley 44, with or without an additional guide pulley, guides the float cable 43, extending from the lever 13, on to the upper pulley 45 while the upper pulley 45 permits the taking off of the float wire in any direction.

At the reservoir, the float wire 43 is passed over pulley 46 which is mounted in a bracket 50 which in turn may be mounted for swivel action about a vertical axis on a beam 52 or, if desired, on the water-delivery pipe. The bracket 50 is provided with a guide hole or eye 51 through which the float wire or cable 43 from the pulley 46 is adapted to pass so that the said wire or cable is guided on to the pulley 46 and prevents it from jumping the pulley due to wind action or lateral movement of the float.

When the tank, reservoir or the like is located at a distance from the windmill, the weight of the float cable or wire 43 will be appreciable and in order to compensate for this additional weight 53 may be provided on the lever 13 for counterbalancing purposes. The said weight 53, shown in broken lines in Figure 1, may be placed on the outside of the weight 41 whereby a large range of weight selection may be provided.

However, should the distance between the tank and the windmill be considerable and the mounting of weight 53 on the lever 13 is insufficient to counteract the weight of the wire or cable 43, the said weight 53 or a larger weight may be coupled to the cable 43 at a position between the pulleys 45 and 46 and is arranged to extend vertically downwardly from pulley 45 as shown in broken lines at 54 (Figure 7) while the cable 43 extends across pulley 44 to the lever 13.

The brake-actuating arm 11 is provided with a link 56 which is connected to the free end of the said arm 11 by one end whereas to the opposite end of said link 56 a length of chain 59 is coupled which in turn has its opposite end connected to the brake cable or wire 57. On the end of the arm 11, which is connected to the toothed wheel shaft, and centred about the said shaft, a grooved sheave-like element 58 is provided for engagement by the chain 59. The arrangement is such that on rotation of the lever arm 11 past its downward dead-centre position, the link engages the side of the arm 11 and on further rotation of the arm 11 the chain 59 is adapted to engage the groove of the sheave element 58 whereby the leverage is reduced and consequently also the effort required with the result that the pressure of the pawls 8 and 17 on the toothed wheel 10 is very much reduced. This reduction of leverage is adapted to take place towards the end of the braking action. When the brake is loose, the lever arm 11 and link 56 extend substantially vertically upwardly, as shown in broken lines in Figure 3, while the fully braked position is shown in full lines on the same figure. An intermediate position is shown in Figure 1. The brake-actuating lever arm 11 may be provided with a plurality of holes for varied fixing of the link so that the device may be used on any sized windmill. The actual purpose of the link 56 is to guide the chain 59 into the groove of the sheave-like element 58, particularly when the device is not mounted absolutely perpendicularly to the brake cable. The pawl-mounting shaft 7 preferably extends in the direction of the brake-actuating lever arm 11 as at 60 in order to form a stop for the said arm 11 in the fully loose position of the windmill. To ensure vertical alignment of the lever arm 11 when in the brake release position a notch 35 is provided in one side for engaging over the shaft extension 60.

The teeth on the section denoted by A, Figure 4, of the toothed wheel 10, have converging faces on both sides for ready disengagement of the pawl 17 while the teeth on the remaining section only have their front faces 61 sloping while the rear faces 62 are substantially radially disposed in order to provide easy disengagement of the locking pawl 8. The locking pawl 8 does not engage the section denoted by A. If particularly desired, the rear faces 62 of the teeth adjacent B may also slope in the same direction as their front face but to a different gradient but this is, however, not essential.

When the apparatus is in the fully braked position substantially as shown in Figure 3, the operation of the device will be as follows. The water level in the reservoir recedes and consequently the float (not shown) is lowered causing the cable 43 to raise the lever arm 13. The auxiliary element 14 is rotated in the same direction by virtue of the projection 32 resting on the lever arm 13 and at the same time the pawl-control element 15 is also raised by virtue of its projection 33 engaging the hole 32 of the auxiliary element 14. The upper curved edge 37 of the device 15 is eventually raised to such an extent to force the pawl 17 out of engagement with the teeth of toothed wheel 10 and subsequently also the locking pawl 8. When this stage is reached, the notch 35 of the auxiliary element 14 has passed beyond the pawl 9 which drops into the notch and locks the auxiliary element 14. Immediately upon disengagement of the locking pawl 8 from the toothed wheel 10, the brake-actuating arm 11 is freed and this arm swings to the chain-dotted position shown in Figure 3 by virtue of the action of the brake spring normally associated with windmill brakes.

When water is now pumped into the reservoir the float is raised and the lever 13 swung in a downward direction until it reaches the approximately lowest horizontal position and has caused the link 24 to be raised. Any further lowering of the lever 13 will cause the bottom end of the slot 26 of link 24 to engage the pin 25 of pawl 9 and this action causes the pawl 9 to release the element 14. The auxiliary element 14 due to its eccentric loading now rotates in an anti-clockwise direction (Figure 1). On rotation of the auxiliary element 14, the device 15 is caused to pivot downwardly allowing the pawls 17 and 8 to engage the teeth of the wheel 10. On operation of the windmill, the lever arm 16 is now oscillated and the toothed wheel 10 caused to rotate in a clockwise direction (Figure 1). As the toothed wheel 10 is rotated, the brake-actuating lever arm 11 is also rotated and when approaching the vertically downwardly projecting position the link 56 is folded to a position next to the arm 11 and the chain 59 in engagement with the sheave-like part 58 thus increasing the mechanical advantage.

When the brake is fully applied, the toothless portion 63 of the toothed wheel 10 is engaged by the pawl 17 and no further rotation is possible. By providing the toothless portion 63, any reciprocating action of the pump rod or the like, after application of the brake will cause no further straining and stressing or breakage of any of the parts of the device.

What I claim is:

1. An automatic windmill regulator comprising a pump rod lever pivoted on a rotatable horizontal shaft, a support fixed to a windmill tower structure in which said shaft is carried, a toothed wheel fixed to said shaft, a pawl attached to the pump rod lever adjacent the pivoted end engaging said toothed wheel whereby the toothed wheel and shaft are intermittently rotatably advanced in one direction on oscillation of the said lever, a locking pawl suspended from the support and also engaging the teeth of the toothed wheel, a brake-actuating arm fixed to said shaft and to which arm a brake-regulating cable of the windmill is connected, a weighted lever pivoted about the said shaft and connected to a control float in a reservoir, an additional pawl suspended from said support, a slotted link connection between said weighted lever and said additional pawl, pawl control means controlled by said additional pawl which in turn controls the engagement and disengagement of said pump rod lever pawl and the locking pawl with the toothed wheel, said pawl control means comprising an eccentrically weighted member and a pivoted cam member, said eccentrically weighted member being pivotally mounted on the said shaft and having a notch for engagement by the said additional pawl when in a raised position against its weight nd further having a projection for resting on said weighted lever for restoring said member, a fixed part on the support about which said cam member is pivoted, said cam member being connected to the eccentrically weighted member for movement with the latter whereby the cam part is normally raised beyond the teeth to free said pawls from the toothed wheel while rapid engagement of the said pawls is effected on retraction of said cam member when the additional pawl releases the eccentrically weighted member on deflection of said pawl by the aforesaid link connection when the weighted lever approaches its lowest position.

2. An automatic windmill regulator as claimed in claim 1 wherein the eccentrically weighted member and the cam member are of plate-like construction and located adjacent one another between the toothed wheel and the float-actuated lever, said eccentrically weighted member having an outwardly directed projection for resting on the upper face of the weighted float-controlled lever for elevation when such lever is raised and a transverse hole therein, and the cam member having a hook-like shape, and having a transverse projection for engaging said transverse hole in the eccentrically weighted member for movement with the latter, and one end of said cam member having a notch for slidable and pivotal engagement with said fixed part on the support.

3. An automatic windmill regulator as claimed in claim 1 wherein the brake actuating arm comprises a lever arm having one end fixed to the shaft, and a part-circular grooved sheave on said fixed end of the arm and centered about the horizontal shaft, a link connected to the free end of said lever and to which link the brake cable is connected, so that during the initial stages of brake application a smaller leverage is produced by the arm while during the final brake-applying stage the brake cable is drawn around the said part-circular sheave to obtain a greater mechanical advantage.

4. An automatic windmill regulator as claimed in claim 1 wherein the toothed wheel is provided with a blank portion devoid of teeth which is brought in register with the lever pawl when the windmill is fully braked to prevent further tightening and straining of the brake cable, the teeth adjacent the said toothless portion and engageable only by the pump rod lever pawl providing converging faces on the opposite sides whereas the remaining teeth are provided with faces of which the front sides are substantially radially disposed and the rear faces are obliquely disposed to such front faces.

5. An automatic windmill regulator as claimed in claim 1 and additional adjustable weight mounted on the float controlled lever to compensate for the weight of the connection of said lever to the control float.

6. An automatic windmill regulator as claimed in claim 1 and a flexible member connecting the control float in a reservoir and the weighted pivoted lever, guide pulley arrangements comprising at least two deeply grooved pulleys mounted one above the other on said windmill tower with the front grooved part of the lower pulley in vertical alignment with the rear grooved part of the upper pulley guiding said flexible member, a swivel bracket having a vertical swivel axis arranged in line with the said alignment of the pulleys on which said upper pulley is mounted, a further guide pulley over which said flexible member passes, a bracket on which said further pulley is mounted in turn mounted for swivel action about a vertical axis on a beam or the like extending over the reservoir, said bracket being provided with a guide hole through which the flexible member from the pulley to the float passes for guiding said member on to said pulley.

7. An automatic windmill regulator as claimed in claim 6 and an additional weight suspended from a second flexible member passing over the upper of the said coacting pairs of pulleys for connection to the flexible member extending between the weighted lever and the float at a position in spaced relationship to the said upper pulley for counteracting the weight of flexible member when of considerable length.

8. An automatic windmill regulator comprising a pump rod lever pivoted on a rotatable horizontal shaft, a support in which said shaft is carried fixed to a corner post of a windmill tower, a flexible member connecting the pump rod lever to a well pump rod for such lever to perform its return downward stroke under its own weight whereas its active upward stroke is performed during the final part of the upward stroke of the pump rod, a toothed wheel fixed to said shaft, a lower pawl attached to the pump rod lever adjacent the pivoted end engaging said toothed wheel whereby the toothed wheel and shaft are intermittently rotated in one direction on oscillation of the said lever, a locking pawl suspended from the support and also engaging the teeth of the toothed wheel preventing rotation of said wheel and shaft when the lever pawl is advanced to a new position, a brake-actuating arm fixed to the said shaft and to which a brake-regulating cable of the windmill is attached, a weighted lever pivoted to the said shaft and connected to a control float in a reservoir, an additional pawl suspended from said support, a slotted link connection between said weighted lever and said additional pawl, pawl control means controlled by said additional pawl which in turn controls the engagement and disengagement of the pump rod lever pawl and the locking pawl with the toothed wheel, said pawl control means comprising an eccentrically weighted member and a pivoted cam member, said eccentrically weighted member being pivotally mounted on said shaft and providing a notch for engagement by the said additional pawl when said member is raised against the action of its weight and further having a projection for resting on the said weighted lever for the latter to restore said eccentrically weighted member after a receding of the level in the reservoir, said cam member being pivoted about a fixed point on the support and connected to the eccentrically weighted member for movement with the latter for raising a curved edge of said cam member beyond the wheel teeth to force the said pawls from the toothed wheel while rapid engagement of said pawls is effected on retraction of the said cam member when the eccentrically weighted member is released on raising of the additional pawl when the float-actuated lever approaches its lowered position.

References Cited in the file of this patent

UNITED STATES PATENTS

| | | |
|---|---|---|
| 258,462 | Newell | May 23, 1882 |
| 356,295 | Stephens | Jan. 18, 1887 |
| 446,627 | Silvester | Feb. 17, 1891 |
| 779,372 | Overby | Jan. 3, 1905 |
| 941,647 | Peterson | Nov. 30, 1909 |